(12) United States Patent
Horodezky et al.

(10) Patent No.: US 8,351,910 B2
(45) Date of Patent: Jan. 8, 2013

(54) METHOD AND APPARATUS FOR DETERMINING A USER INPUT FROM INERTIAL SENSORS

(75) Inventors: Samuel Jacob Horodezky, San Diego, CA (US); Leonid Sheynblat, Hillsborough, CA (US); Scott Alan Leazenby, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 404 days.

(21) Appl. No.: 12/326,738

(22) Filed: Dec. 2, 2008

(65) Prior Publication Data

US 2010/0136957 A1 Jun. 3, 2010

(51) Int. Cl.
*H04W 88/02* (2009.01)

(52) U.S. Cl. ................................. 455/414.2; 455/556

(58) Field of Classification Search ............ 455/414.2, 455/556; 701/153, 207; 422/182; 345/156, 345/158, 619, 660; 216/100
See application file for complete search history.

(56) References Cited

U.S. PATENT DOCUMENTS

| 6,681,176 | B2 * | 1/2004 | Funk et al. ............... 701/207 |
| 6,892,575 | B2 | 5/2005 | Nasiri et al. |
| 6,975,959 | B2 * | 12/2005 | Dietrich et al. ........... 702/153 |
| 7,938,004 | B1 | 5/2011 | Brunsch, Jr. et al. |
| 2005/0212766 | A1 | 9/2005 | Reinhardt et al. |
| 2006/0106533 | A1 * | 5/2006 | Hirokawa ............... 701/207 |
| 2006/0256076 | A1 * | 11/2006 | Liou et al. ............... 345/156 |
| 2007/0018964 | A1 | 1/2007 | Moon et al. |
| 2007/0103431 | A1 | 5/2007 | Tabatowski-Bush |
| 2007/0175865 | A1 * | 8/2007 | Zerbini et al. ............ 216/100 |
| 2007/0214886 | A1 | 9/2007 | Sheynblat |
| 2007/0247434 | A1 | 10/2007 | Cradick et al. |
| 2007/0248508 | A1 * | 10/2007 | Gidney et al. ............ 422/182 |
| 2008/0011080 | A1 * | 1/2008 | Merassi et al. ........... 73/510 |
| 2008/0120056 | A1 | 5/2008 | Haino et al. |
| 2008/0134784 | A1 | 6/2008 | Jeng et al. |
| 2008/0158176 | A1 | 7/2008 | Land et al. |
| 2008/0174550 | A1 * | 7/2008 | Laurila et al. ............ 345/158 |
| 2008/0234935 | A1 | 9/2008 | Wolf et al. |
| 2009/0303204 | A1 * | 12/2009 | Nasiri et al. ............. 345/184 |
| 2010/0088061 | A1 | 4/2010 | Horodezky et al. |

FOREIGN PATENT DOCUMENTS

| EP | 1271288 A2 | 1/2003 |
| EP | 1531598 A2 | 5/2005 |
| WO | WO2008041975 | 4/2008 |

OTHER PUBLICATIONS

Alois, et al: "Physical Shortcuts for Media Remote Controls", ICST INTETAIN '08, 2008.
Proceedings of the 2nd International Conference on Intelligent Techonogies for Interactive Enterainment; Jan. 8-10, 2008, Cancun, Mexico, p. 8PP, XP007911662, paragraph [04.1] paragraph [4.2.3].

(Continued)

*Primary Examiner* — Diane Mizrahi

(57) ABSTRACT

A system and method for determining a user input based on movements of a mobile device. In a particular implementation, angular movement of the mobile device about at least one axis of a linear plane is detected. Linear movement of the mobile device along at least one axis of the linear plane is also detected. Finally, a user input is determined based on the detection of the angular movement and the detection of the linear movement.

35 Claims, 13 Drawing Sheets

OTHER PUBLICATIONS

Gemmell J et al: "Telling Stories with Mylifebits" IEEE International Conference on Multimedia and Expo, 2005. ICME 2005. Amsterdam, The Netherlands, Jul. 6-8, 2005, IEEE, Piscataway, NJ, USA, Jul. 6, 2005, pp. 1536-1539, XP010843963 ISBN: 978-0-7803-9331-8 the whole document.

International Search Report and the Written Opinion—PCT/US2009/066447, International Search Authority—European Patent Office—Feb. 10, 2010.

International Search Report and Written Opinion—PCT/US09/059851, International Searching Authority—European Patent Office, Apr. 9, 2010.

Partial International Search Report—PCT/US2009/059851, International Search Authority—European Patent Office, Feb. 22, 2010.

Yatani K et al: "Information Transfer Techniques for Mobile Devices by Toss and Swing Actions", Dec. 2, 2004, Mobile Computing Systems and Applications, 2004. WMCSA 2004 Sixth IEEE Workshop on Windermere, Cumbria, UK. Dec. 2-3, 2004. Piscataway, NJ, USA, IEEE, pp. 144-151, XP010757454, paragraph [0004]—paragraph [0005].

IGN Staff, E3 2006: Seeing the Difference Wiimote vs. PS3-mote. Did Sony just steal a revolution?, IGN E3 Expo Coverage, May 8, 2006, IGN Entertainment Incorporated, http://wii.ign.com/articles/705/705870p1.html.

Lawrence I. Charters, Fingerprints: Why you care about the iPhone, Electric PI Washington Apple PI Journal Online, May 17, 2008, Washington Apple Pi, Ltd., Rockville, MD, http://www.wap.org/journal/fingerprints/default.html.

\* cited by examiner

METHOD AND APPARATUS FOR DETERMINING A USER INPUT FROM INERTIAL SENSORS

BACKGROUND

1. Field

The invention relates generally to a mobile device for determining a user input based on movement detected by one or more motion sensors.

2. Information

Conventional mobile devices, such as mobile telephones, typically allow an operator to input control commands via mechanical/electrical buttons. These buttons may include stand-alone buttons, keypads and keyboards, and touch screens. These buttons are typically positioned on front and side surfaces of a mobile device and require mechanical assemblies and electrical wiring to that physical location of the button on the various surfaces. Wiring must be routed from the physical location of the button to control electronics, which monitors an operator's activation of buttons. Additionally, once a mobile device is manufactured, repositioning of mechanical buttons on the mobile device is virtually impossible. A touch screen, which may be used both as an output device and an input device, may also perform the function of a conventional button. Unfortunately, the display of a touch screen is partially obstructed whenever an operator uses it as an input device.

The above-described conventional buttons and touch screens require mechanical elements, which wear, degrade and fail with time. These conventional buttons and touch screens also require electronics at and wiring to the position of the buttons. Furthermore, these buttons and touch screens are not readily repositionable. Furthermore, the display of a touch screen may become smudged, smeared or scratched from an operator's use, thus further hindering an operator's ability to view an unobstructed display. Voice activation allows an operator an alternate to these buttons, however, such voice control requires the use of a microphone and a relatively quiet environment.

A user may often carry or have such a mobile device nearby when in the vicinity of electronic equipment, such as a television or stereo system. In order to operate such electronic equipment, a user often has to use a dedicated remote control to transmit a control signal to such electronic equipment. Unfortunately, however, such a remote control often becomes misplaced and the user therefore has to spend time and effort looking for the remote control in order to operate the electronic equipment.

BRIEF DESCRIPTION OF THE FIGURES

Non-limiting and non-exhaustive features will be described with reference to the following figures, wherein like reference numerals refer to like parts throughout the various figures.

SUMMARY

Figure 1A:
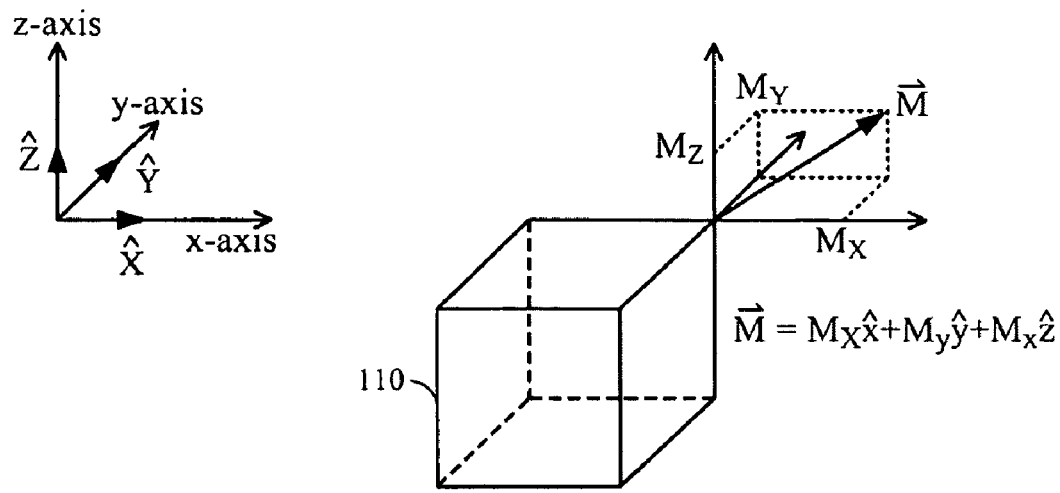
FIG. 1A shows a coordinate system (x, y, z) for representing linear movement with respect to scalar values, a series of scalar values, or time varying functions ($M_X$, $M_Y$, $M_Z$) as measured by an accelerometer according to one aspect.

In one particular implementation, a method is provided for determining a user input based on movements of a mobile device. Angular movement of the mobile device about at least one axis of a linear plane is detected. Linear movement of the mobile device along at least one axis of the linear plane is also detected. Finally, a user input may be determined based on detection of the angular movement and detection of the linear movement. It should be appreciated, however, that this is merely a sample implementation, and claims subject matter is not limited in this respect.

DETAILED DESCRIPTION

Reference throughout this specification to "one example", "one feature", "an example" or "one feature" means that a particular feature, structure, or characteristic described in connection with the feature and/or example is included in at least one feature and/or example of claimed subject matter. Thus, the appearances of the phrase "in one example", "an example", "in one feature" or "a feature" in various places throughout this specification are not necessarily all referring to the same feature and/or example. Furthermore, the particular features, structures, or characteristics may be combined in one or more examples and/or features.

There are currently portable electronic devices that may determine a user's inputs based on a way in which the user is positioning such a portable electronic device. For example, one particular portable electronic device may change an orientation of a displayed image on a display screen if a user turns the portable electronic device in a particular direction. In one example, by rotating a portable electronic device in a clockwise direction, an image displayed on a display screen of the portable electronic device may be rotated. Accordingly, such a portable electronic device may determine a user's input based on an angular movement of the portable electronic device by a user.

There is a gaming device in the art that may determine a user's inputs based on linear movements of a handheld gaming controller. A linear movement may comprise a physical movement of such a handheld gaming controller in a three-dimensional space and is independent from any rotational movement. For example, a user input may be determined by such a handheld gaming controller based upon movement of the handheld gaming controller along a linear axis. Such a gaming device determines a user input based on linear movements, but not angular movements, of the handheld gaming controller.

However, a number of user inputs that can be determined from detection of only angular movement or of only linear movements is relatively limited. There may be, for example, many additional user inputs that could be determined if other types of both linear and angular movements were determined. Accordingly, by only determining angular movements or only detecting linear movements, as opposed to determining both angular and linear movements, a total amount of possible user inputs may be relatively limited.

Current systems may determine only linear movements or only angular movements for a variety of reasons. For example, current portable electronic devices may not consume power in an efficient manner. Accordingly, if both linear and angular movements were detected simultaneously by various electronic circuitry, battery life for such current portable electronic devices may be dramatically shortened. Moreover, an amount of heat generated by use of electronic circuitry for detecting both angular and linear movements may adversely affect overall system performance in currently used portable electronic devices. Use of circuitry for determining both linear movements and angular movements may also be cost-prohibitive. For example, in the gaming industry manufacturers strive to produce inexpensive gaming systems and may even lose money from sales of the gaming systems themselves, with the hope that enough consumers will purchase such gaming systems that the manufacturers will be able to recoup gaming system losses on the sales of associated video games for use with such gaming systems, for example.

A method and system is described herein for a portable electronic device capable of determining user inputs based on a combination of linear and angular movements of the portable electronic device. Such a portable electronic device may include various sensor(s) for detecting linear and angular movements. A user input may be determined based on a combination of such detected linear and angular movements. By detecting both angular and linear movements, a robust system is realized for determining a wide array of user inputs.

As used herein, a "handheld mobile device," "mobile device," or a "mobile station" (MS) refers to a device that may from time to time have a position and/or orientation that may be altered. Such changes in position and/or orientation may comprise changes to direction, distance, angular rotation, etc., as a few examples. In particular examples, a mobile station may comprise a cellular telephone, wireless communication device, user equipment, laptop computer, other personal communication system (PCS) device, and/or other portable communication device. A mobile station may also comprise a processor and/or computing platform adapted to perform functions controlled by machine-readable instructions.

In one implementation, a mobile device may include a single sensor or multiple sensors, which convert physical phenomena into analog and/or electrical signals. Such sensors may include, for example: (1) a barometric pressure sensor used to measure atmospheric pressure; (2) a geomagnetic sensor used to determine the direction of Earth's magnetic field; (3) a biometric sensor used to measure heart rate or blood pressure; (4) a touch sensor used to detect touch or a fingerprint; (5) an accelerometer used to sense the direction of gravity and any other linear force experienced by the sensor; and (6) a gyroscope used to measure a Coriolis effect, heading changes and rotation, just to name a few examples of sensors.

Such sensors may enable different mobile applications depending on which sensors are integrated into a wireless device. Some applications may employ more than one measurement from at least one sensor and may employ multiple degrees (axes) of observability from a sensor. Furthermore, a sensor may filter measurements before further processing, described below, occurs. Moreover, different applications may employ different combinations of sensors wherein such sensors may play different roles.

In the case of navigation, both accelerometers and gyroscopes ("gyros") may be used to provide 6-axis of observability (x, y, z, $\tau$, $\phi$, $\psi$). An accelerometer may sense linear motion (i.e., translation in a plane, such as a horizontal plane). Translation can be measured with reference to at least two axes. Such an accelerometer can also offer a measure of an object's tilt (roll or pitch). Thus, with a single 3D accelerometer, an object's motion in Cartesian coordinate space (x, y, z) can be sensed, and the direction of gravity can be sensed to estimate the object's roll ($\tau$) and pitch ($\phi$). Since accelerometers may not be able to easily differentiate between the object's linear motion and tilt, a gyroscope may be used to measure the rotation about (x, y, z) coordinates, that is, roll ($\tau$) and pitch ($\phi$) and yaw ($\psi$), sometime referred to as azimuth or heading.

Further information about multi-sensor devices is provided in, for example, U.S. Provisional Application 60/896,795, titled "Multi-Sensor Data Collection and/or Processing" with a filing date of Mar. 23, 2007; U.S. Provisional Application 60/909,380, titled "Multi-Sensor Data Collection and/or Processing" with a filing date of Mar. 30, 2007; U.S. Provisional Application 60/914,716, titled "Multi-Sensor Data Collection and/or Processing" with a filing date of Apr. 27, 2007; U.S. patent application Ser. No. 12/054,303, titled "Multi-Sensor Data Collection and/or Processing" by inventors L. Sheynblat and T. Wolf and filed Mar. 24, 2008; and U.S. patent application Ser. No. 11/686,945, titled "Sensor-Based Orientation System" by inventor L. Sheynblat and filed on Mar. 15, 2007. These sensors, as well as other possible sensors not listed, may be used individually or may be used in combination, depending on a particular application.

In movement detection applications, linear and angular accelerometers, geomagnetic sensors, and/or gyroscopes may be integrated into a mobile device to provide adequate degrees of observability. FIG. 1A shows a coordinate system (x, y, z) for representing linear movement with respect to scalar values, a series of scalar values, or time varying functions ($M_X$, $M_Y$, $M_Z$) as measured by an accelerometer 110. Some accelerometers 110 may provide a magnitude while others may simply provide an indication of movement without a magnitude. An accelerometer 110 may measure linear movement (vector M) along a line with reference to one, two or three linear directions, often referenced with Cartesian coordinates (x, y, z). For example, a one-dimensional accelerometer 110 may provide measurements to indicate linear movement along an x-axis. A two-dimensional accelerometer 110 may provide measurements to indicate linear movement in a plane along both x-axis and y-axis, and a three-dimensional accelerometer 110 may provide measurements to indicate linear movement in 3-dimensional space along x, y and z-axes. A three-dimensional accelerometer 110 may comprise a two-dimensional accelerometer combined with a one-dimensional accelerometer, or may comprise three one-dimensional accelerometers. An accelerometer 110 may provide measurements in terms of linear acceleration (in units representing distance per units of time squared; e.g., $[m/sec^2]$), linear velocity (in units representing distance per units of time; e.g., [m/sec]), or linear distance (in units representing distance; e.g., [m]). Linear motion (vector M) may be represented by three values in vector form $M=M_X X + M_Y Y + M_Z Z$, where $(M_X, M_Y, M_Z)$ are magnitudes, scalar values, a series of scalar values, or time varying functions, and (X, Y, Z) are unit vectors with respect to the origin of a Cartesian coordinate system (x, y, z). In general, an accelerometer as described herein may comprise a sensing means for detecting motion and generating information indicative of linear movement along the one, two or three axes of such an accelerometer. Alternatively, a non-Cartesian coordinate system can be used such as a coordinate system aligned with the body frame of the device. An important requirement for any coordinate system used is that its axes are mutually orthogonal.

Figure 1B:
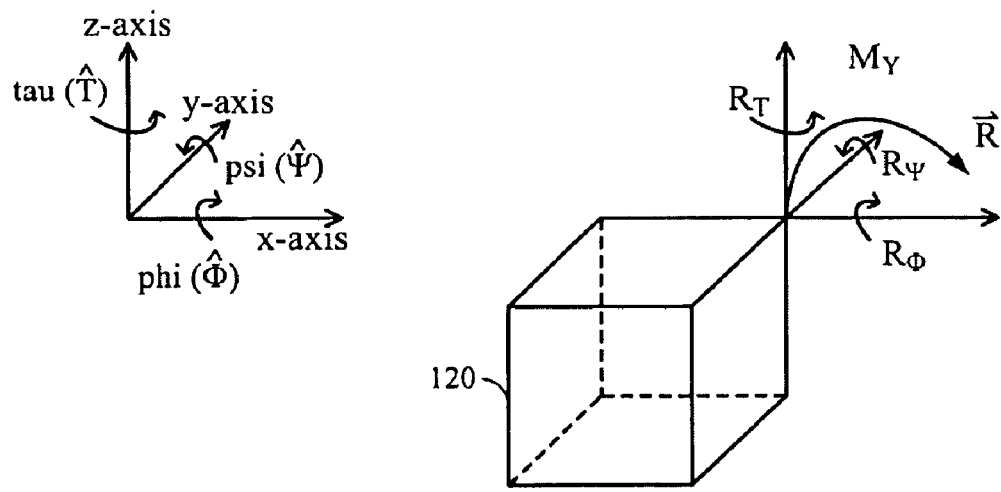
FIG. 1B shows a coordinate system ($\tau$, $\phi$, $\psi$) for representing rotational movement with respect to scalar values, a series of scalar values, or time varying functions ($R_\tau$, $R_\phi$, $R_\psi$) as measured by a gyroscope according to one aspect.

FIG. 1B shows a coordinate system $(\tau, \phi, \psi)$ for representing rotational movement with respect to scalar values, a series of scalar values, or time varying functions $(R_\tau, R_\phi, R_\psi)$ as measured by a gyroscope 120. Here, gyroscope 120 may measure rotational movement (vector R) about one, two or three axes. In one particular implementation, gyroscopic rotation may be measured in terms of coordinates $(\tau, \phi, \psi)$, where tau $(\tau)$ represents yaw or rotation about the z-axis, phi $(\phi)$ represents roll or rotation about the x-axis, and psi $(\psi)$ represents pitch or rotation about the y-axis. In another implementation, gyroscope 120 may comprise a one-dimensional gyroscope to provide measurements indicating rotational movement about a first axis. In another implementation, a gyroscope 120 may comprise a two-dimensional gyroscope to provide measurements indicating rotational movement about a first axis and a second axis. Likewise, in another implementation, gyroscope 120 may comprise a three-dimensional gyroscope to provide measurements indicating rotational movement about first, second and third axes. Such three-dimensional gyroscope may comprise a two-dimensional gyroscope combined with a one-dimensional gyroscope or may comprise three one-dimensional gyroscopes. Gyroscope 120 may provide measurements in terms of angular acceleration (in units representing change in an angle per unit of time squares; e.g., $[rad/sec^2]$), angular velocity (in units representing change in an angle per unit of time; e.g., [rad/sec]), or an angle (in units representing an angle; e.g., [rad]). Rotational motion (vector R) may be represented by three scalar values, a series of scalar values, or time varying functions in vector from, where $R=R_\tau \tau + R_\phi \phi + R_\psi \psi$, where $(R_\tau, R_\phi, R_\psi)$ are scalar values, a series of scalar values, or time varying functions, and where $(\tau, \phi, \psi)$ are unit vectors in with respect to the rotational coordinate system $(\tau, \phi, \psi)$. In particular implementations, a gyroscope, as described herein, may comprise a sensing means for detecting motion and producing information indicative of angular movement about one, two or three axes of the gyroscope.

A single accelerometer 110 may sense linear movement while a single gyroscope 120 may measure angular movement such as a tilt or roll. Integrating two separate accelerometers 110, two separate gyroscopes 120 or the combination of an accelerometer 110 and a gyroscope 120 into a mobile device may be used to sense linear movement as well as angular movement, for example.

In one example, a three-dimensional accelerometer 110 and a three-dimensional gyroscope (e.g., gyroscope 120) provide six axes of observability (x, y, x, $\tau$, $\phi$, $\psi$). Two three-dimensional accelerometers 110 may also provide six axes of observability $(x_1, y_1, x_1, x_2, y_2, x_2)$. A reduced dimensional sensor may be used to sense fewer axes of linear and/or rotational motion. For example, a two-dimensional accelerometer 110 and a two-dimensional gyroscope 120 may provide four axes of observability (x, y, $\tau$, $\phi$). Techniques described herein may implement a single-sensor or a multi-sensor mobile device measuring one or more dimensions as described in detail below.

Figure 2:
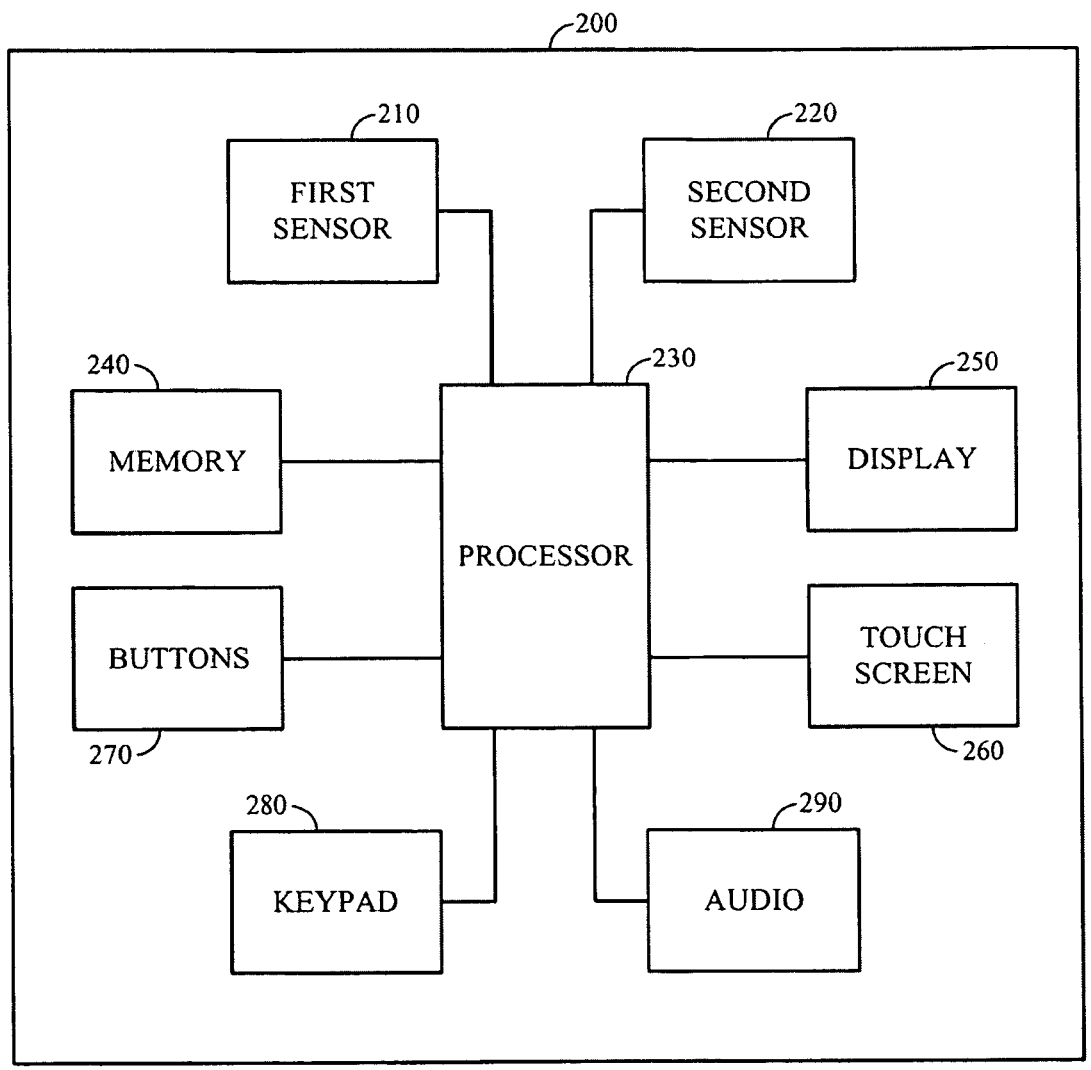
FIG. 2 is a schematic block diagram of a mobile device according to one aspect.

FIG. 2 is a schematic block diagram of mobile device 200 according to a particular implementation. Mobile device 200 may house a first sensor 210, a second sensor 220, a processor 230, memory 240 and a display 250. In one particular implementation, the first sensor 210 may comprise an accelerometer, and the second sensor 220 may comprise a gyroscope. Although only two sensors are shown in FIG. 2, it should be appreciated that additional, or fewer, sensors may be utilized in other implementations without deviating from claimed subject matter. Moreover, in another implementation, a single sensor may be adapted to measure both linear and angular motion. Mobile device 200 may also include devices and circuitry to accept operator input and provide output data including a touch screen 260 integrated with the display 250, one or more buttons 270, one or more keypads 280 and/or an audio device 290 (such as a speaker and/or a microphone).

Figure 3A:
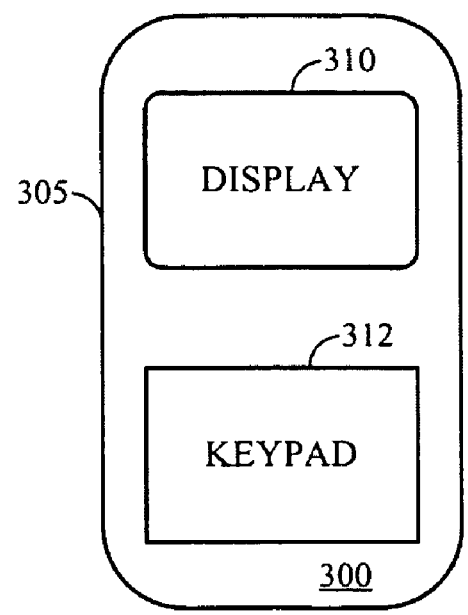
FIGS. 3A though 3C show alternate views of a mobile device according to one aspect.
Figure 3B:
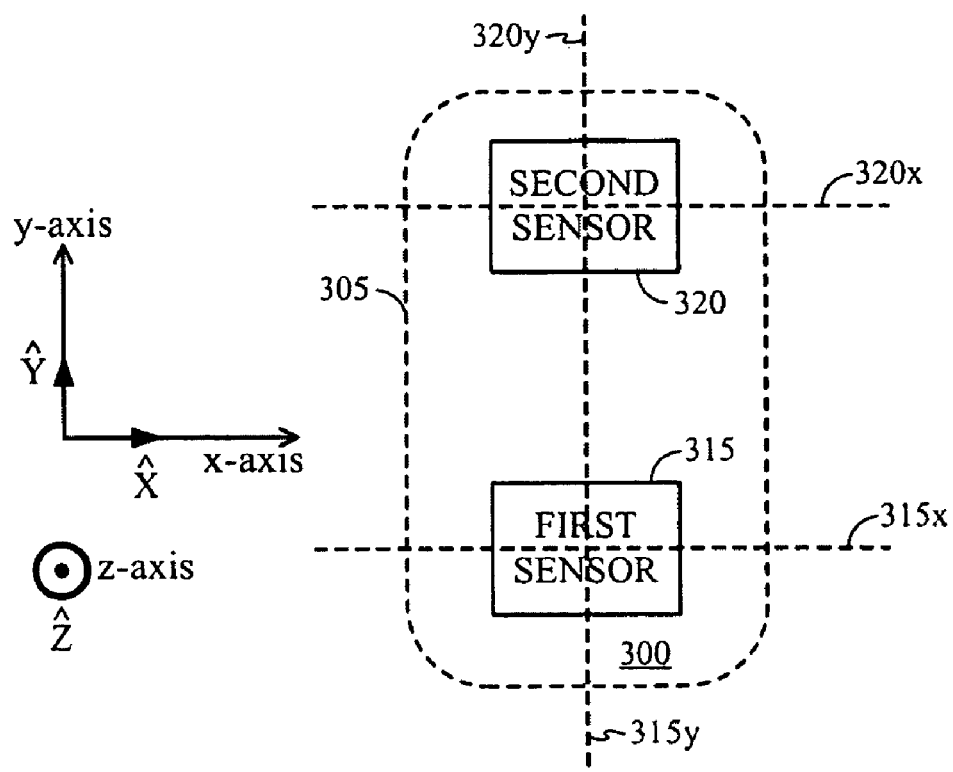

FIGS. 3A though 3C show alternate views of a mobile device 300. In FIG. 3A, an exterior view of mobile device 300 is shown to include a housing 305, a display 310 and a keypad 312. FIG. 3B illustrates a view of components disposed within housing 305, such as a first sensor 315 and a second sensor 320. Housing 305 may enclose additional items such as, for example, processor 230 and memory 240 (such as those in, e.g., FIG. 2). It should be appreciated that a first sensor 315 and a second sensor 320 do not need to be located on opposite sides of a housing 305; instead, they are shown residing on opposite sides for illustrative purposes. It should be appreciated that in one particular implementation, first sensor 315 and second sensor 320 may be disposed side-by-side in housing 305, and that claimed subject matter is not limited to any particular arrangement of sensors in a mobile device.

Figure 3C:
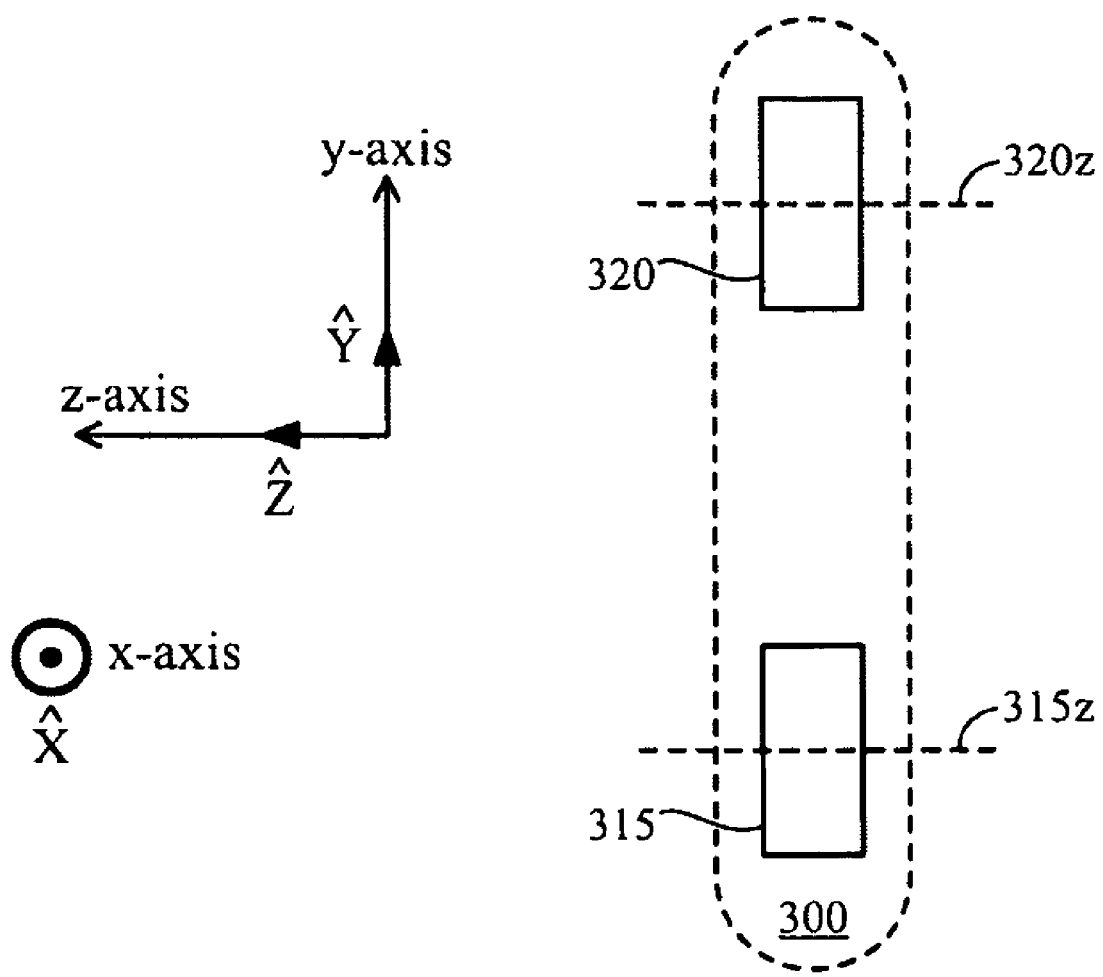

FIG. 3C shows a side-end view of mobile device 300. First sensor 315 may comprise either a gyroscope or an accelerometer, e.g., which defines one or more axes (e.g., an x-axis 315x, a y-axis 315y and a z-axis 315z) respectively corresponding to one, two or three dimensions of first sensor 315. For example, first sensor 315 may comprise a one-dimensional gyroscope positioned within housing 305 to measure angular movement of mobile device 300 about a first axis of first sensor 315. First axis may be the x-axis 315x, y-axis 315y, z-axis 315z, or a similar axis. For example, if the first axis is the z-axis 315z, the first sensor 315 would be oriented to generate a signal indicative of angular movement of the mobile device 300 about z-axis 315z of first sensor 315.

In another example, first sensor 315 may comprise a three-dimensional gyroscope oriented within housing 305 to measure angular movement of the mobile device 300 about the x-axis 315*x*, y-axis 315*y* and z-axis 315*z* (or a similar set of three axes). In this example, first sensor 315 may be oriented to generate a signal indicative of angular movement of mobile device 300 about x-axis 315*x*, y-axis 315*y* and z-axis 315*z* of first sensor 315.

Similarly, second sensor 320 may also comprise a gyroscope or an accelerometer, which defines one or more axes (e.g., an x-axis 320*x*, a y-axis 320*y* and a z-axis 320*z*) respectively corresponding to one, two or three dimensions of second sensor 320. For example, second sensor 320 may comprise a one-dimensional accelerometer oriented within housing 105 to measure linear movement of mobile device 300 along a first axis of second sensor 320. This first axis may comprise x-axis 320*x*, y-axis 320*y*, z-axis 320*z*, or any axis. For example, if this first axis is x-axis 320*x*, second sensor 320 may be oriented to generate a signal indicative of linear movement of the mobile device 300 along x-axis 320*x* of second sensor 320.

As an example, first sensor 315 may comprise a gyroscope and second sensor 320 may comprise an accelerometer. Here, first sensor 315 is oriented in housing 305 to detect and measure angular movement of mobile device 300 about a first axis (e.g., z-axis 315*z*) of first sensor 315. First sensor 315 may generate a signal indicative of this angular movement. Second sensor 320 (an accelerometer) may be oriented to measure linear movement along a first axis of second sensor 320 (e.g., x-axis 320*x*). In this orientation, first axis (z-axis 315*z*) of first sensor 315 and first axis (x-axis 320*x*) of second sensor 320 are non-collinear to one another and may be orthogonal to one another. Although x, y, and z axes are discussed herein for the purposes of illustration, claims are not limited to orthogonal axes (although substantially orthogonal axes may be used in particular implementations).

According to a particular implementation, a combination of a gyroscope and an accelerometer may be utilized to detect a user input. For example, there may be a mapping application program which is adapted to display a graphical map image on a display of a mobile device 300. Here, for example, a user may manipulate such a displayed graphical map image simply by moving the mobile device itself, instead of by pressing buttons. For example, by moving the mobile device 300 up or down, e.g., along a predefined axis, a displayed map may be zoomed in or out, respectively, and the amount of the zooming may be based on the amount (e.g., a distance) by which the mobile device 300 was moved. The user may also change a direction in which the graphical map image is facing by, for example, tilting or rotating the mobile device 300 in a designated direction.

Such a mobile device 300 may also be utilized to detect a user input for a variety of different applications, for example. In one particular implementation, a user may move the mobile device in a pre-designated manner to control an electronic device (e.g., as a remote control). For example, such a mobile device 300 may be utilized to control playback of a video on a nearby television. In one implementation, the user may cause the video to control for advancing or rewinding by a certain number of frames, for example, by tilting mobile device 300 in a specified direction. For example, by tilting the mobile device to the right, such video may advance, whereas tilting the mobile device to the left may cause the video to rewind for as long as the user positions the mobile device in this orientation.

There are many additional applications for which the mobile device may be utilized to determine a user input other than video and mapping applications as discussed above. The mobile device may be utilized to control a wide variety of electronic devices such as stereo systems, televisions, a dimmer for a lighting system, to name just a few.

Figure 4A:
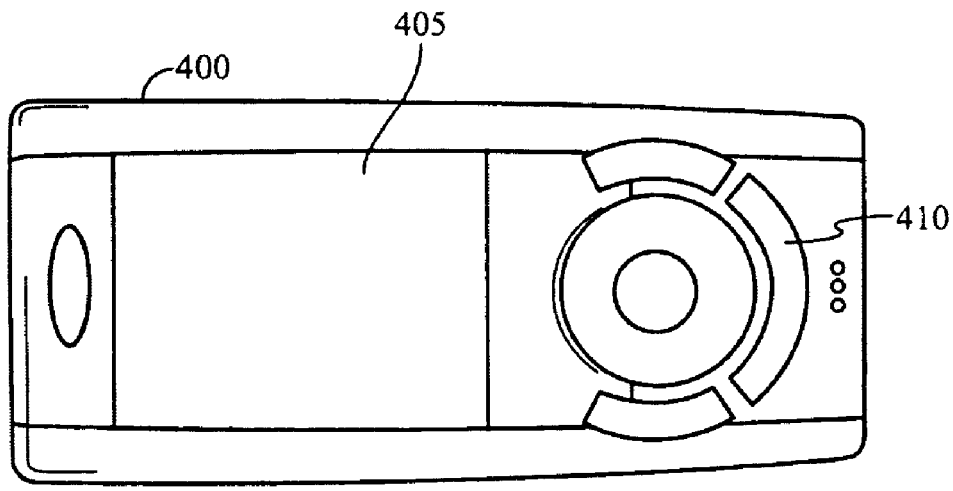
FIG. 4A illustrates a mobile device according to one particular implementation.

FIG. 4A illustrates a mobile device 400 according to one particular implementation. Mobile device 400 may comprise a mobile phone or personal digital assistant (PDA), for example. Such a mobile device 400 may include a display 405 and input buttons 410, for example. Such a display 405 may comprise a Liquid Crystal Display (LCD) or any other suitable display device for displaying images and/or video. Such input buttons 410 are optional and may be included in some implementations. Mobile device 400 may be adapted to determine user inputs without buttons, so input buttons 410 may therefore be optional, depending upon the particular implementation. Mobile device 400 may include one or more sensors (not shown), such as a gyroscope and/or accelerometer, for determining linear and/or angular movement of such mobile device 400.

Figure 4B:
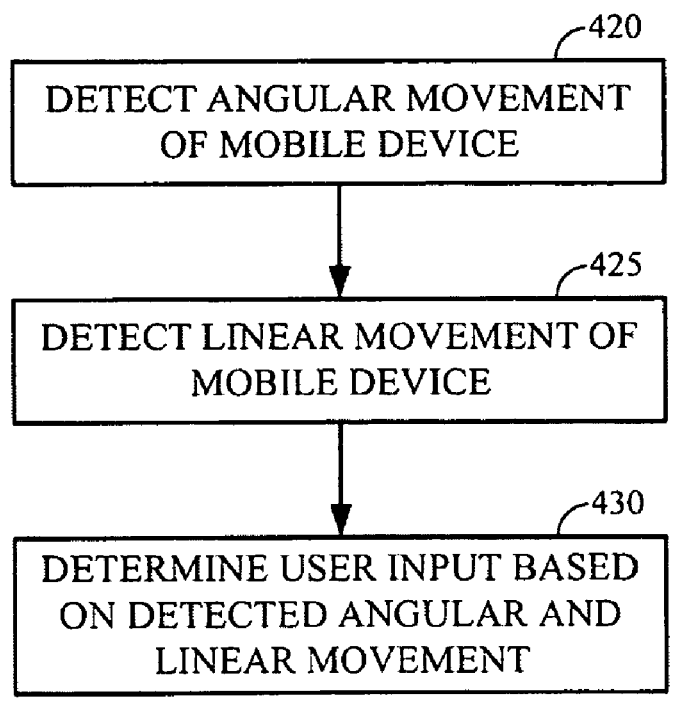
FIG. 4B illustrates a process for determining a user input based on a user's movement of a mobile device according to one implementation.

FIG. 4B illustrates a process for determining a user input based on a user's movement of a mobile device 400 according to one implementation. First, angular movement of mobile device 400 is detected at operation 420. Angular movement may be detected by a sensor, such as a gyroscope, within mobile device 400. Next, linear movement of mobile device 400 is detected at operation 425. Linear movement may be detected by a sensor, such as an accelerometer, within mobile device 400. It should be appreciated that operations 420 and 425 may be performed simultaneously or operation 425 may be performed before operation 420 in some implementations. Finally, at operation 430, a user input is determined based upon detected angular and linear movement of mobile device 400.

Figure 5:
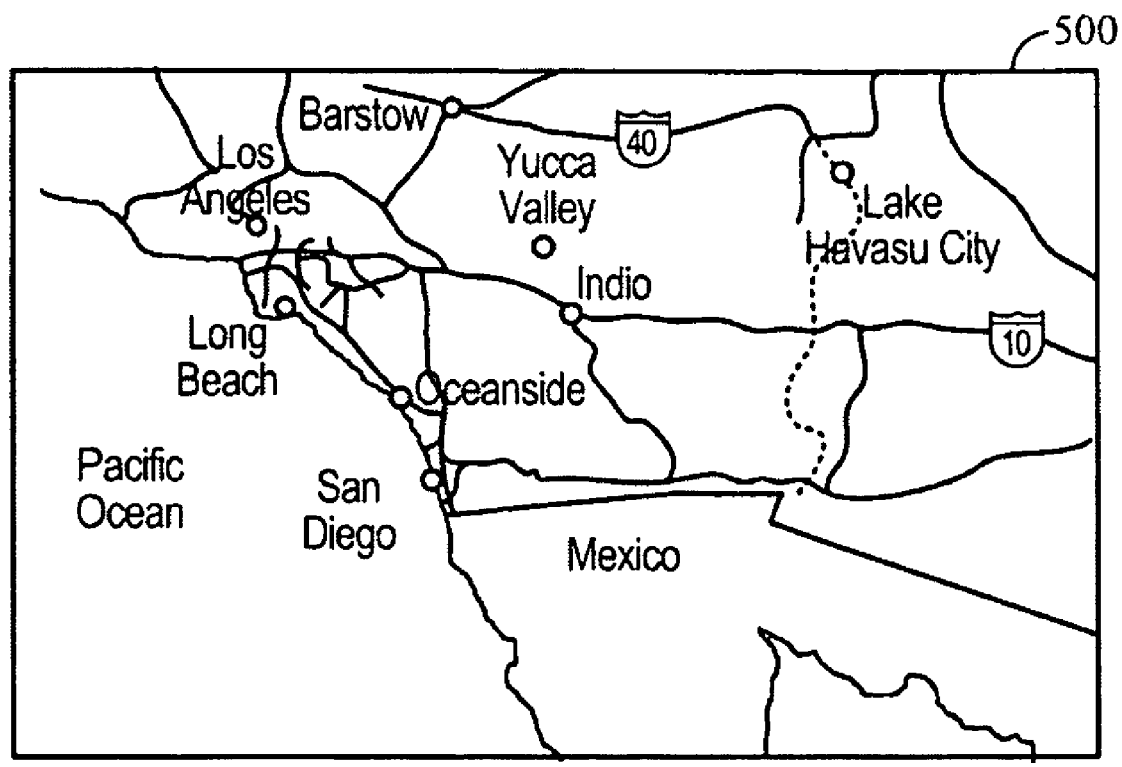
FIG. 5 illustrates a map image that may be displayed on display of a mobile device in one particular implementation.

FIG. 5 illustrates a map image 500 that may be displayed on display 405 of mobile device 400 in one particular implementation. A user may enter an address for which a map image is desired. Alternatively, mobile device 400 may be adapted to receive location services (e.g., satellite position system, advanced forward link trilateration, or a hybrid location system) to estimate a current location of the mobile device 400 and generate a map image based on the estimated location. In one implementation, mapping images may be stored in a memory of mobile device 400. Alternatively, such mapping images may be stored in a remotely accessible mapping database and may be transmitted to mobile device 400 in response to a request from mobile device 400 for a particular map image. In this example, map image 500 shows a broad view of the San Diego area and surrounding areas. In the event that a user desires to view a zoomed in map image, such a user may move mobile device 400 closer to the user's face.

Figure 6:
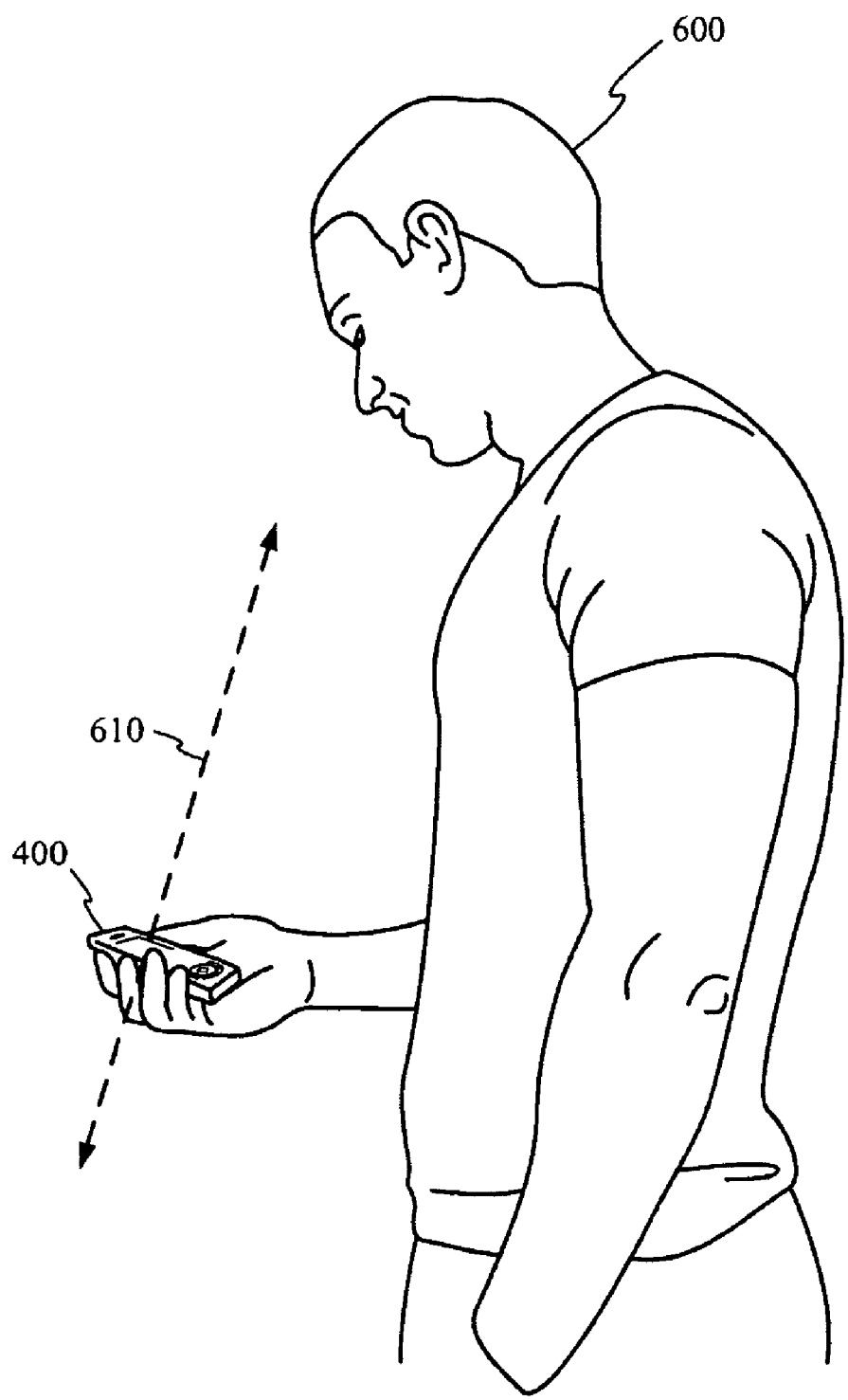
FIG. 6 illustrates a user holding a mobile device and moving the mobile device along an axis toward and away from the user's face according to one implementation.

FIG. 6 illustrates a user 600 holding a mobile device 405 and moving mobile device 400 in a direction along one or more axes toward and away from the face of user 600. An accelerometer or other sensor may be included within mobile device 400 to detect linear movement along axis 610. With a map image being displayed on mobile device 400, for example, user 600 may cause the map image to zoom in by moving the mobile device 400 along axis 610 in a direction closer to the face of user 600. The amount by which the map image is zoomed may be based upon a detected acceleration imparted by user 600 as mobile device 400 is moved, or the approximate distance by which mobile device 400 is moved. In another example, user 600 may zoom out such a map image by moving mobile device 600 in an opposite direction along axis 610, i.e., away from the face of user 600.

Figure 7:
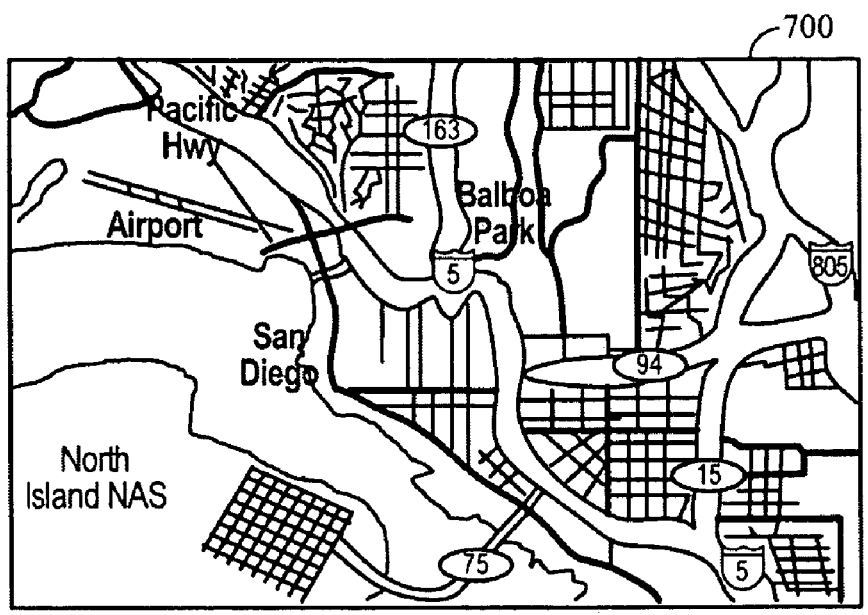
FIG. 7 illustrates a map image that may be displayed on a display of a mobile device in one particular implementation.

FIG. 7 illustrates a map image 700 that may be displayed on a display 405 of mobile device 400 in one particular implementation. In this example, map image 500 may be originally shown on display 405. User 600 may then zoom in on the map image 500 by moving mobile device 400 along axis 610 toward the face of user 600, as described above with respect to FIG. 6. As shown in FIG. 7, a new zoomed in map image 700 is displayed that illustrates San Diego in greater detail than was shown in map image 500 illustrated in FIG. 5. As discussed above, user 600 may zoom out by moving mobile device 400 along axis 610 in a direction away from the face of user 600.

Figure 8:
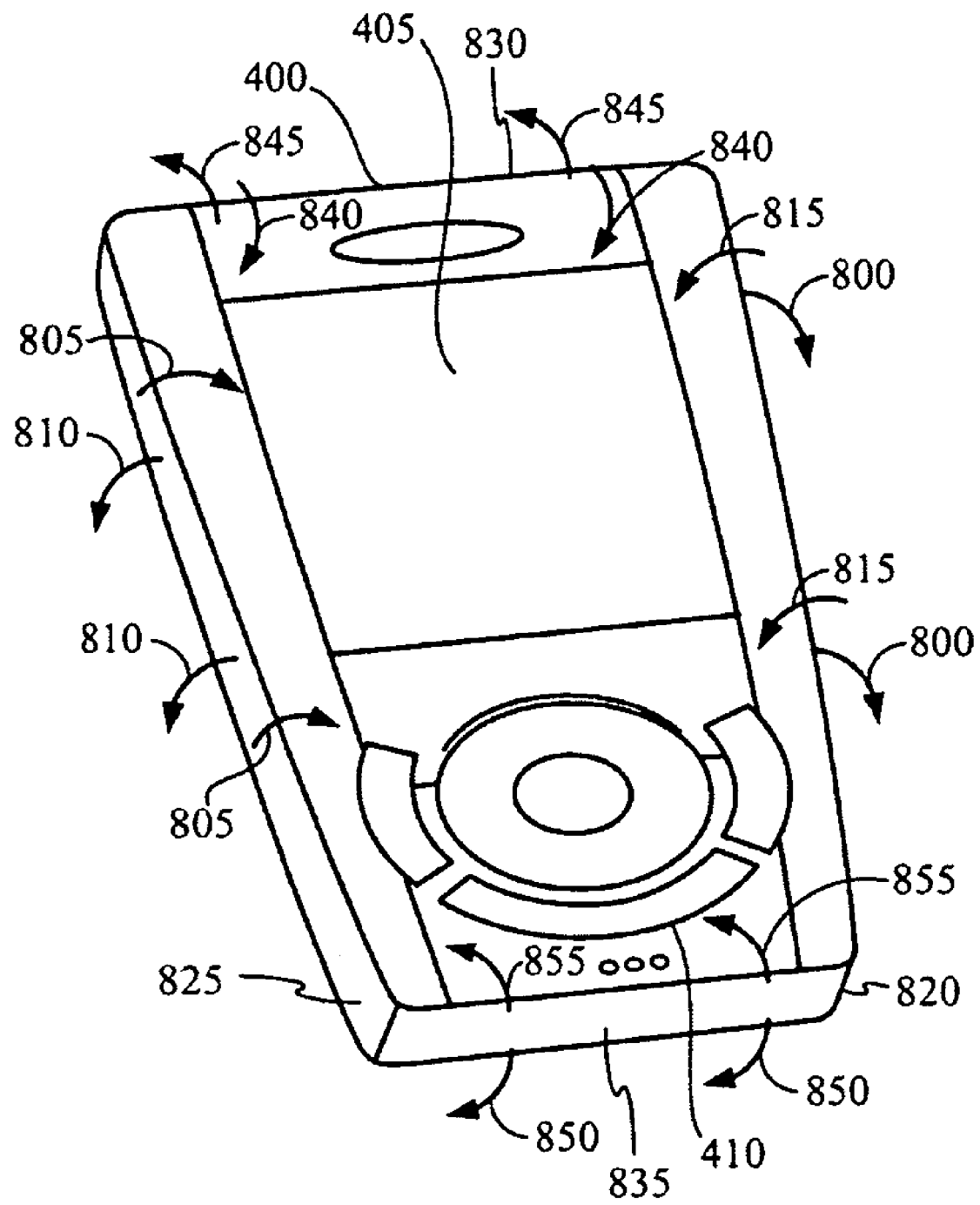
FIG. 8 illustrates a side view of a mobile device according to one particular implementation.

User 600 may also change a mapping image displayed without zooming the image. FIG. 8 illustrates a side view of mobile device 400 according to one particular implementation. To shift the viewed map to the right, i.e., to see portions of the map to the right of the map material displayed, the user 600 may tilt mobile device 400 such that the right end 820 of mobile device 400 is rotated downward and the left end 825 is rotated upward, as shown with arrows 800 and 805, respectively. To shift the viewed map to the left, on the other hand, user 600 may tilt mobile device 400 such that the left end 825 of mobile device 400 is rotated downward and the right end 820 is rotated upward, as shown with arrows 810 and 815, respectively.

Figure 9:
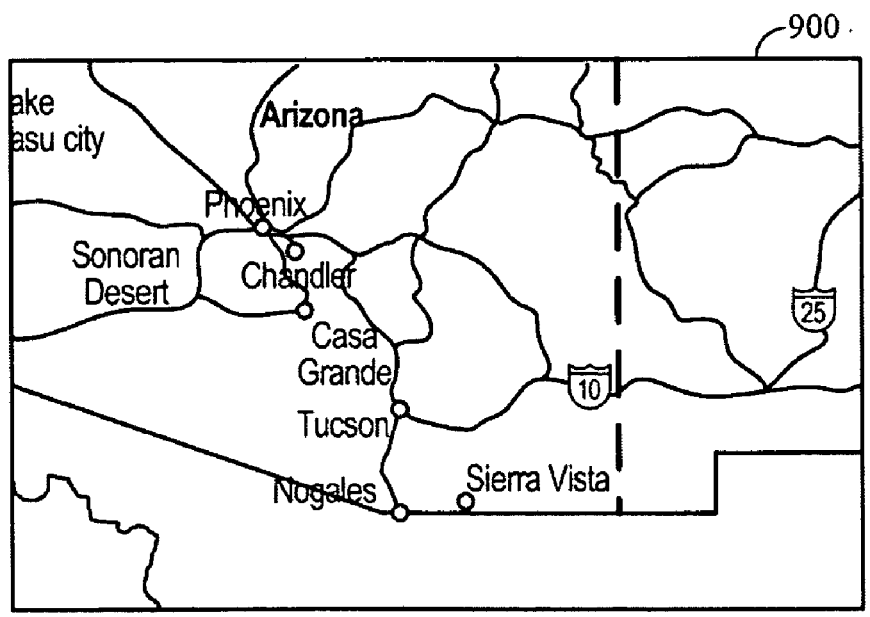
FIG. 9 illustrates a map image that may be displayed on a display of a mobile device in one particular implementation.

FIG. 9 illustrates a map image 900 that may be displayed on a display 405 of mobile device 400 in one particular implementation. In this example, map image 500 is originally shown on display 405, and then user shifts the image to the right by lowering the right end 820 and raising the left end 825 of mobile device 400, as discussed above with respect to FIG. 8, for example. As shown in FIG. 9, a new map image 900 is displayed that illustrates an area east of San Diego (i.e., to the right of San Diego on a map).

User 600 may also tilt mobile device 400 to get a view above, i.e., the area that would be above a currently displayed image on a map, or to get a view below, i.e., the area that would normally be below a currently displayed image on a map. In order to shift a map up or down, instead of simply left or right as discussed above, the user 600 may hold the mobile device 400 and rotate the top edge of the mobile device 400 (i.e., the edge near where the top portion of a map image would be displayed on display 405) upward and the bottom edge of mobile device 400 downward. Referring back to FIG. 8, in order to see a view above a currently displayed map image on display 405 of mobile device 400, the user 600 may tilt, i.e., rotate, a top portion 830 of handheld mobile device above a bottom portion 835, as indicated by arrows 840 and 850, respectively. Alternatively, user 600 may shift the map image downward by rotating mobile device 400 in the opposite direction such that a top edge of the mobile device 400 is rotated downward and the bottom edge of mobile device 400 upward. Referring again to FIG. 8, in order to see a view below a currently displayed map image on display 405 of mobile device 400, the user 600 may tilt, i.e., rotate, a top portion 830 of handheld mobile device below a bottom portion 835, as indicated by arrows 845 and 855, respectively.

Figure 10:
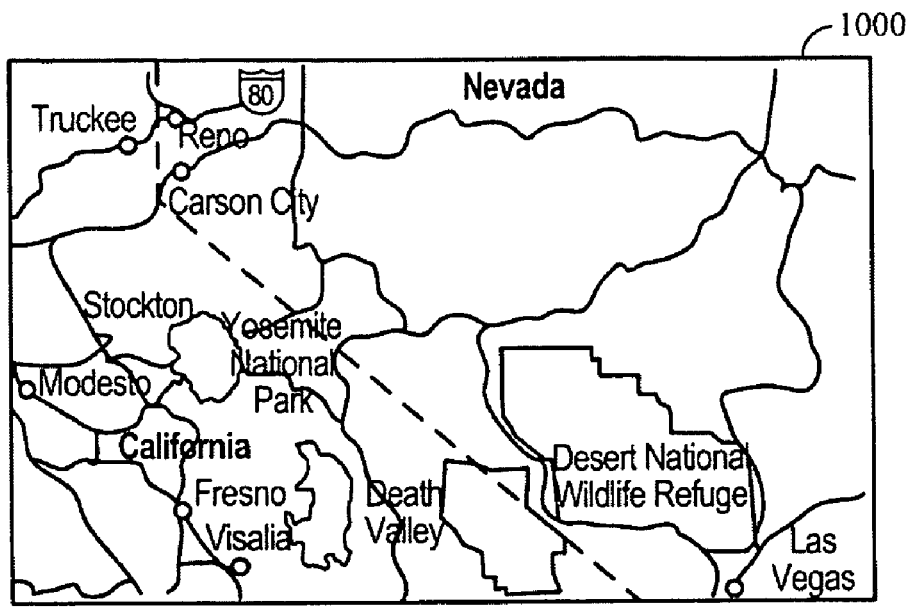
FIG. 10 illustrates a map image that may be displayed on a display of a mobile device in one particular implementation.

FIG. 10 illustrates a map image 1000 that may be displayed on a display 405 of mobile device 400 in one particular implementation. In this example, map image 500 was originally shown on display 405 and then user shifted the image higher, i.e., to see the map area above a previously viewed map image, by rotating the top edge of the mobile device 400 upward and the bottom edge of mobile device 400 downward as discussed above with respect to FIG. 9. As shown in FIG. 10, a new map image 1000 is displayed that illustrates an area north of San Diego (i.e., above San Diego on a map).

In one implementation, additional information may be displayed on a map image. For example, designated "point(s) of interest" may be displayed on the map. The designated points of interest indicate certain areas of a map for which additional map information is known and may be displayed. The additional map information may include for example, pictures associated with area on the map and/or text describing an area on such a map. The points of interest may be determined based on information stored in a database, for example. In one particular implementation, a user may take photographs with a enabled camera capable of determining its location from a location service, and location coordinates may be associated with and stored as information associated with each of such photographs. Location information associated with such photographs may be correlated with a map image such that if a user displays a map image covering location coordinates corresponding to those of stored images, an indicator may be displayed on such a map to indicate that additional information for such GPS coordinates is available. In some implementations, points of interest for certain landmarks may be stored in a database accessible to mobile device 400.

Figure 11:
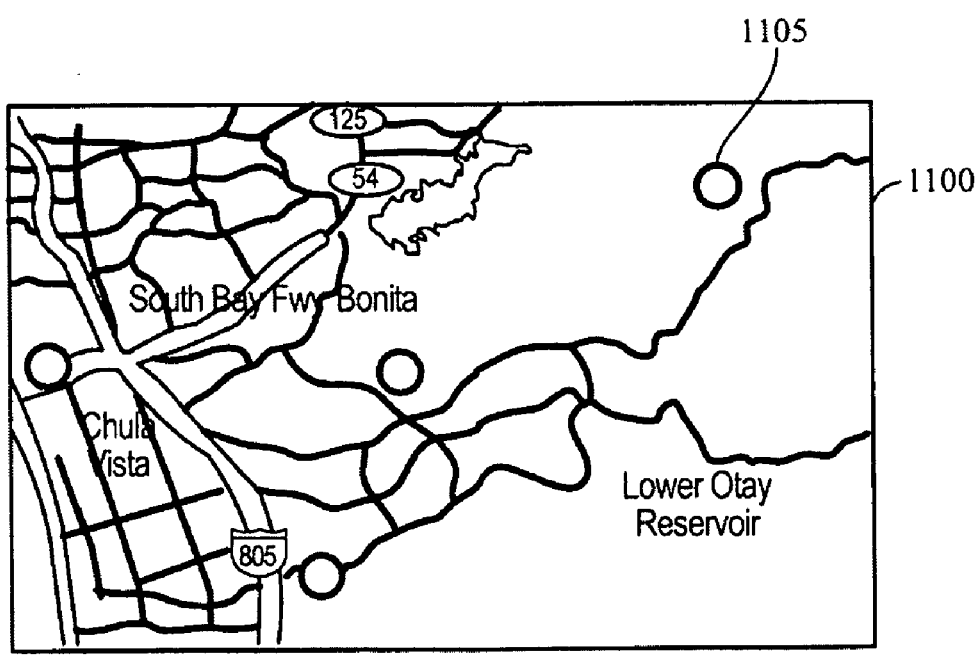
FIG. 11 illustrates a map image that may be displayed on a display of a mobile device in one particular implementation.

FIG. 11 illustrates a map image 1100 that may be displayed on display 405 of mobile device 400 in one particular implementation. In this example, map image 1100 includes several points of interest 1105, which is this case are displayed as large dark dots. A user 600 may zoom in on an area of a map image 1100 surrounding a particular point of interest to acquire additional information about such a point of interest.

Figure 12:
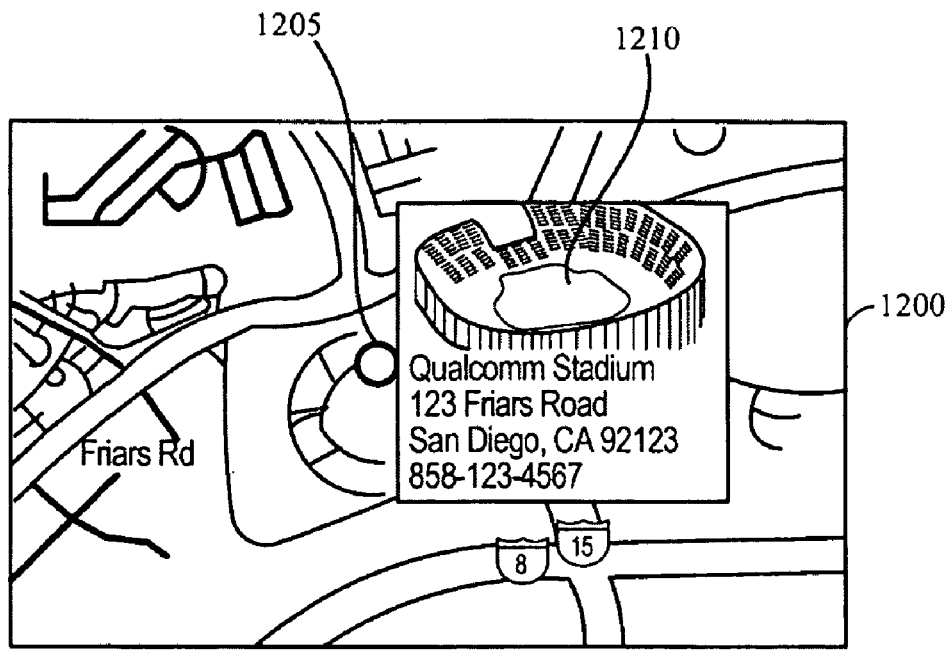
FIG. 12 illustrates a map image that may be displayed on a display of a mobile device in one particular implementation.

FIG. 12 illustrates a map image 1200 that may be displayed on display 405 of mobile device 400 in one particular implementation. In this example, map image 1200 includes a point of interest 1205. Upon zooming in on an area surrounding point of interest 1205, an image 1210 corresponding to such a point of interest may be displayed. In this case, such an image 1210 illustrates Qualcomm Stadium, which is associated with such point of interest 1205.

Figure 13:
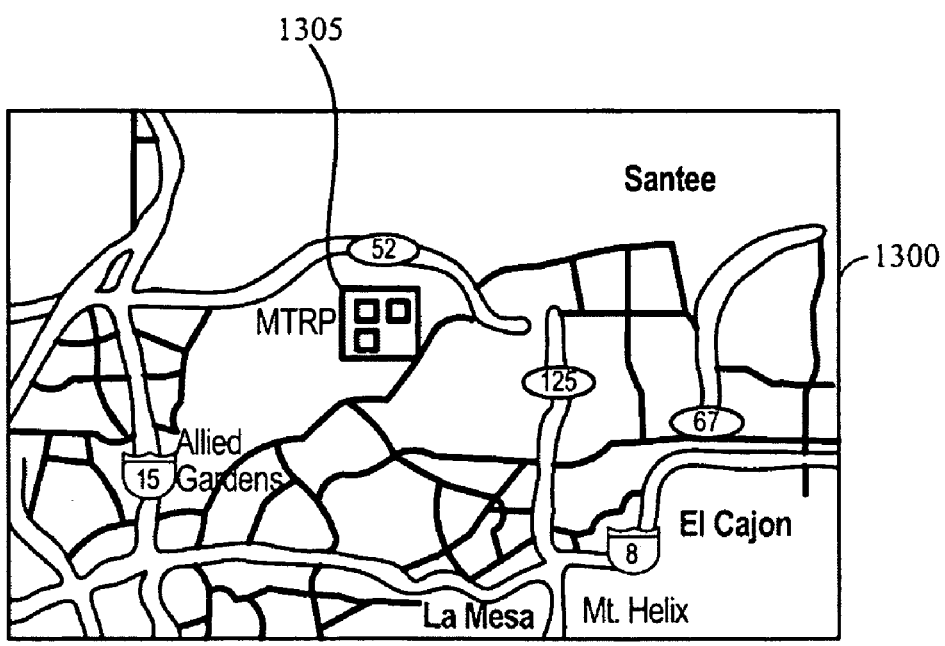
FIG. 13 illustrates a map image that may be displayed on a display of a mobile device in one particular implementation.

FIG. 13 illustrates a map image 1300 that may be displayed on display 405 of mobile device 400 in one particular implementation. In this example, map image 1300 includes a point of interest 1305 which, in this case is shown as a dark square in which three smaller white squares are shown. Upon zooming in on an area surrounding point of interest 1305, several images associated with point of interest 1305 may be displayed.

Figure 14:
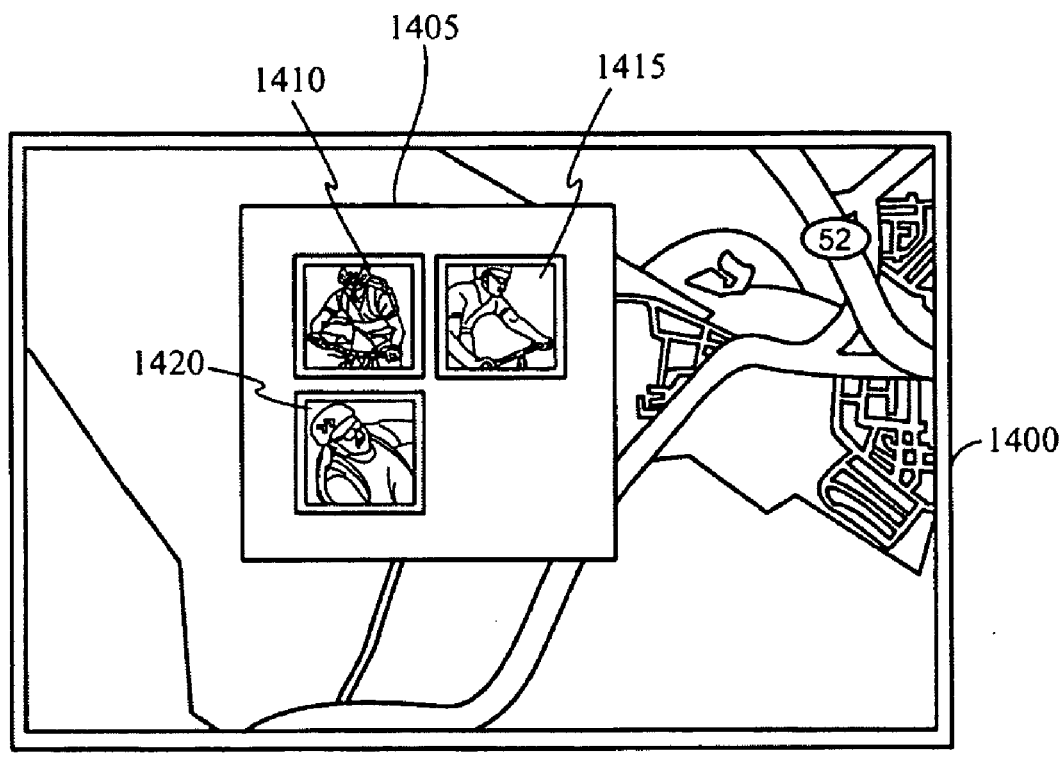
FIG. 14 illustrates a map image that may be displayed on a display of a mobile device in one particular implementation.
Figure 15:
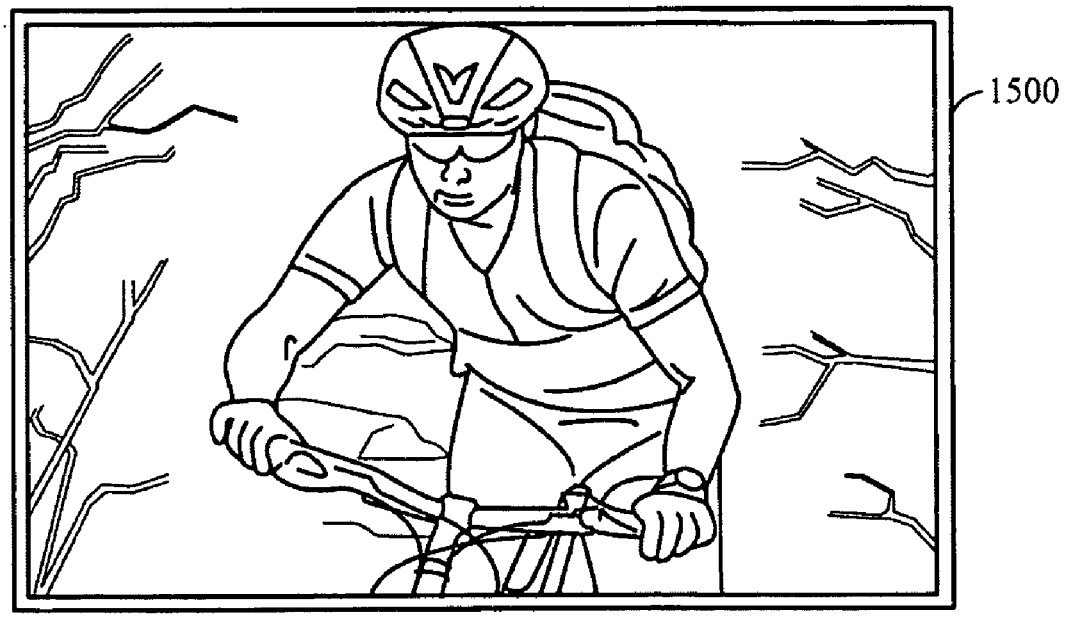
FIG. 15 illustrates an enlarged image associated with a particular time according to one aspect.

FIG. 14 illustrates a map image 1400 that may be displayed on a display 405 of mobile device 400 in one particular implementation. In this example, map image 1400 includes a point of interest 1405. In this example, point of interest 1405 is enlarged because a user has zoomed in on it. Point of interest 1405 includes three images designated 1410, 1415, and 1420, respectively. Each of such images is associated with point of interest 1405. For example, point of interest 1405 may be associated with a particular area of a bike path covered by map 1400 and upon zooming, an image of a bicycle rider along the bike path may be displayed. Upon zooming in on image 1410, for example, a large corresponding image 1500 may be displayed, as shown in FIG. 15. Image 1500 may include a caption to indicate the time and date on which the image was originally acquired. In this example, there are three images associated with point of interest 1405. Upon viewing large image 1500, a user may scroll to the next image by holding mobile device 400 in a particular way. For example, by tilting mobile device 400 to the right, the user may scroll to the next image associated with point of interest 1405. On the other hand, the user may scroll to a previous image associated with point of interest 1405 by tilting mobile device 400 to the left.

Figure 16:
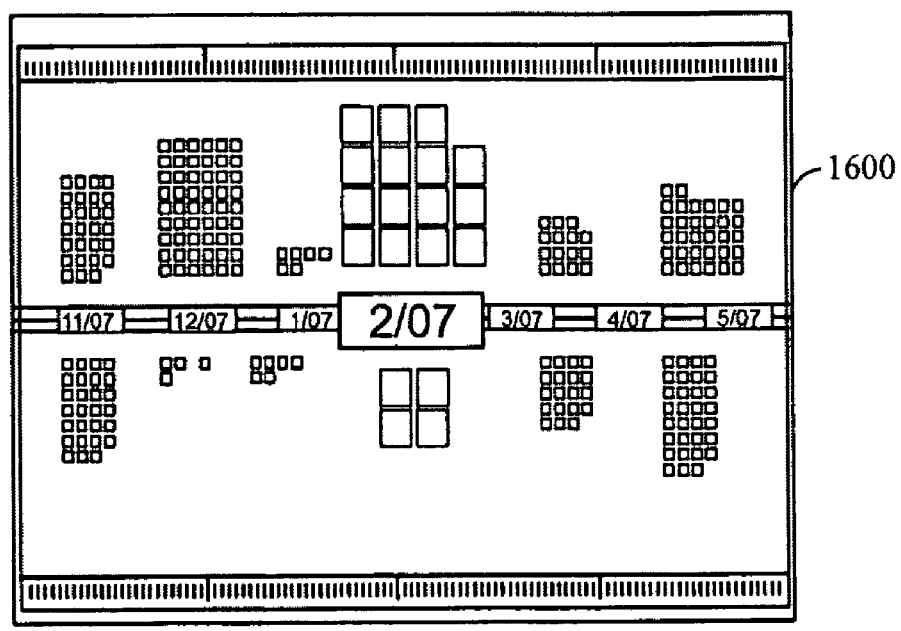
FIG. 16 illustrates an image in which various boxes associated with images are displayed along a time line according to one aspect.

There are other implementations in which images may be displayed upon the user zooming in on the image. For example, instead of displaying associated with a location on a geographical map, such images may instead be displayed along a virtual time line. FIG. 16 illustrates an image 1600 in which various boxes associated with images are displayed along a time line. In this example, there are several images associated with each month along a time line. In this case, there are 19 images associated with 2/07. The user may scroll along the time line by, for example, tilting mobile device 400 to the right to advance in date along the time line and to the left to go back in date along the time line. The user may also zoom in on one or more images associated with a particular date by moving mobile device 400 in a direction associated with a zoom operation such as, for example, by moving mobile device 400 close to the user's face, as discussed above with respect to FIG. 6.

Figure 17:
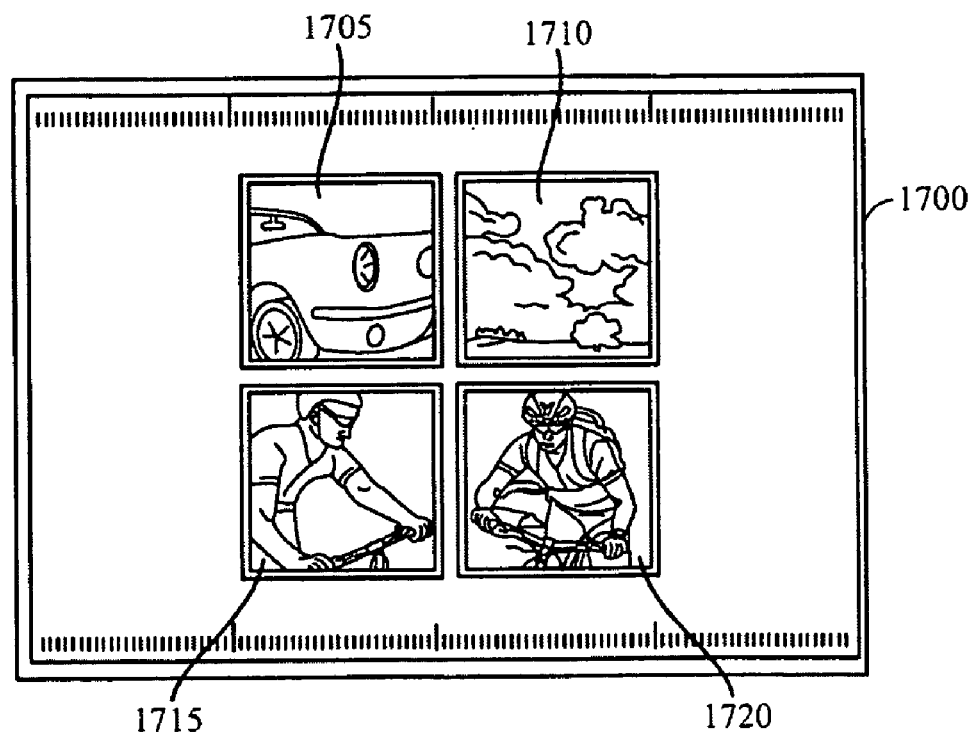
FIG. 17 illustrates an image in which four images associated with a particular date along a time line may be displayed upon a user zooming in on such a date according to one aspect.

FIG. 17 illustrates an image 1700 in which four additional images, 1705, 1710, 1715, and 1720 associated with a particular date along a time line may be displayed upon a user zooming in on such a date. In this example, small white boxes, such as those shown in FIG. 1600 may initially be displayed and user may zoom in to see small versions of images 1705, 1710, 1715, and 1720. The user may zoom in on any of images 1705, 1710, 1715, or 1720 to view a larger corresponding image.

Although FIGS. 5-17 have been described above with respect to implementations in which images may be displayed on a display 405 of a mobile device 400, it should be appreciated that additional implementations may also be realized. In one implementation, a user may utilize mobile device 400 to generate a control signal to control a particular electronic device. For example, a user may turn the volume up or down on a stereo system by moving mobile device 400 in a particular way. Upon detecting movement of mobile device 400 and determining to what the movement corresponds, mobile device may generate a control signal for such a stereo system and may transmit the control signal to such a stereo system.

A user may generate control signals for a variety of different electronic devices by moving mobile device 400 in different designated directions. Accordingly, mobile device 400 may effectively be utilized as a remote control for different electronic devices. A user may also alter settings on the mobile device 400 itself via different movements. For example, a user may change a ring volume or vibration frequency by imparting certain movements onto mobile device 400.

Implementations described above may be utilized to determine a user input based on a user's angular and linear movement of a mobile device. By determining a user input in this manner, a user would not need to manually type of an instruction via buttons or the like. Although movements for zooming and scrolling through images have been described in a particular manner above, it should be appreciated that, in some implementations, different movements may be imparted to perform such zooming and scrolling functions. In one implementation, a user may program such a mobile device with particular movements for scrolling and zooming, to name just a couple functions.

Methodologies described herein may be implemented by various means depending upon applications according to particular features and/or examples. For example, such methodologies may be implemented in hardware, firmware, software, and/or combinations thereof In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. Again, these are merely examples of an instruction and claimed subject matter is not limited in this respect.

"Storage medium" as referred to herein relates to media capable of maintaining expressions which are perceivable by one or more machines. For example, a storage medium may comprise one or more storage devices for storing machine-readable instructions and/or information. Such storage devices may comprise any one of several media types including, for example, magnetic, optical or semiconductor storage media. Such storage devices may also comprise any type of long term, short term, volatile or non-volatile memory devices. However, these are merely examples of a storage medium, and claimed subject matter is not limited in these respects.

Unless specifically stated otherwise, as apparent from the discussion above, it is appreciated that throughout this specification discussions utilizing terms such as "processing," "computing," "calculating," "selecting," "forming," "enabling," "inhibiting," "locating," "terminating," "identifying," "initiating," "detecting," "obtaining," "hosting," "maintaining," "representing," "estimating," "receiving," "transmitting," "determining" and/or the like refer to the actions and/or processes that may be performed by a computing platform, such as a computer or a similar electronic computing device, that manipulates and/or transforms data represented as physical electronic and/or magnetic quantities and/or other physical quantities within the computing platform's processors, memories, registers, and/or other information storage, transmission, reception and/or display devices. Such actions and/or processes may be executed by a computing platform under the control of machine-readable instructions stored in a storage medium, for example. Such machine-readable instructions may comprise, for example, software or firmware stored in a storage medium included as part of a computing platform (e.g., included as part of a processing circuit or external to such a processing circuit). Further, unless specifically stated otherwise, processes described herein, with reference to flow diagrams or otherwise, may also be executed and/or controlled, in whole or in part, by such a computing platform.

Wireless communication techniques described herein may be in connection with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may comprise an IEEE 802.11x network, and a WPAN may comprise a Bluetooth network, an IEEE 802.15x, for example. Wireless communication implementations described herein may also be used in connection with any combination of WWAN, WLAN and/or WPAN.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. A method, comprising:
   detecting angular movement of a mobile device about at least one axis of a linear plane;
   detecting linear movement of said mobile device along at least one axis of said linear plane;
   determining a user input based on the detection of said angular movement and the detection of said linear movement; and
   manipulating an appearance of one or more images on a display of said mobile device based at least in part on said user input and a predetermined point of interest, wherein said appearance of one or more images depict a geographical map, wherein said geographical map includes said predetermined point of interest.

2. The method of claim 1, wherein said manipulating comprises zooming said one or more images based, at least in part, on said detection of said linear movement.

3. The method of claim 2, wherein said geographical map comprises said one or more images associated with one or more predetermined locations of said geographical map.

4. The method of claim 1, wherein said appearance of one of more images depict a sequence of images corresponding to a timing offset.

5. The method of claim 1, further comprising providing a control signal to a predetermined electronic device based on said user input.

6. The method of claim 1, wherein said determining a user input comprises determining a user input based, at least in part, upon a predetermined sensitivity of at least one of said angular movement and said linear movement.

7. The method of claim 1, wherein said detecting linear movement comprises detecting an acceleration of said mobile device.

8. The method of claim 1, wherein said detecting linear movement comprises detecting a distance by which said mobile device is moved.

9. The method of claim 1, wherein said detecting angular movement is performed by a first sensor, and said detecting linear movement being performed by a second sensor.

10. The method of claim 1, wherein said detecting angular movement and said detecting linear movement is performed by a single sensor.

11. A mobile device, comprising:
    at least one sensor to detect angular movement of said mobile device about at least one axis of a linear plane and linear movement of said mobile device along at least one axis of said linear plane; and
    a processor coupled to said at least one sensor configured to determine a user input based on the detection of said angular movement and the detection of said linear movement, and
    manipulate an appearance of one or more images on a display of said mobile device based at least in part on the detection of said angular movement, the detection of said linear movement, and a predetermined point of interest, wherein said appearance of one for more images depict a geographical map, wherein said geographical map includes said predetermined point of interest.

12. The mobile device of claim 11, wherein said processor is configured to manipulate said appearance of one or more images by zoom said one or more images based, at least in part, on the detection of said linear movement.

13. The mobile device of claim 11, wherein said processor is configured to manipulate said appearance of one of more images to depict a sequence of images corresponding to a timing of said one or more images.

14. The mobile device of claim 11, further comprising a control device to provide a control signal to a predetermined electronic device based on said user input.

15. The mobile device of claim 11, wherein said processor is d configured to determine said user input based, at least in part, upon a predetermined sensitivity of at least one of said angular movement and said linear movement.

16. The mobile device of claim 11, wherein said processor is configured to determine said user input based, at least in part, upon a predetermined range of at least one of said angular movement and said linear movement.

17. The mobile device of claim 11, wherein said at least one sensor is configured to detect linear movement based on a detected acceleration of said mobile device.

18. The mobile device of claim 11, wherein said at least one sensor is configured to detect linear movement based on a detected distance by which said mobile device is moved.

19. The mobile device of claim 11, wherein said at least one sensor comprises a first sensor to detect said angular movement, and a second sensor to detect said linear movement.

20. The mobile device of claim 11, wherein said at least one sensor comprises a single sensor to detect said angular movement and said linear movement.

21. An apparatus, comprising:
    means for detecting angular movement of a mobile device about at least one axis of a linear plane and linear movement of said mobile device along at least one axis of said linear plane;
    means for determining a user input based on the detection of said angular movement and detection of said linear movement; and means for manipulating an appearance of one or more images on a display of said mobile device based at least in part on the detection of said angular movement, detection of said linear movement, and a predetermined point of interest, wherein said appearance of one for more images depict a geographical map, wherein said geographical map includes said predetermined point of interest.

22. The mobile device of claim 21, wherein said means for manipulating the appearance zooms said one or more images based, at least in part, on the detection of said linear movement.

23. The mobile device of claim 21, wherein said means for manipulating the appearance manipulates said appearance of one of more images to depict a sequence of images corresponding to a timing of said images.

24. The mobile device of claim 21, further comprising means for providing a control signal to a predetermined electronic device based on said user input.

25. The mobile device of claim 21, wherein said means for determining the user input determines said user input based, at least in part, upon a predetermined sensitivity of at least one of said angular movement and said linear movement.

26. The mobile device of claim 21, wherein said means for detecting detects linear movement based on acceleration of said linear movement of said mobile device.

27. The mobile device of claim 21, wherein said means for detecting detects linear movement based on a distance by which said mobile device is moved.

28. The mobile device of claim 21, wherein said means for detecting comprises a first sensor to detect said angular movement, and a second sensor to detect said linear movement.

29. The mobile device of claim 21, wherein said means for detecting comprises a single sensor to detect said angular movement and said linear movement.

30. An article comprising: a storage medium comprising machine-readable instructions stored thereon which, when executed by a computing platform, are configured to enable the computing platform to:
   detect angular movement of a mobile device about at least one axis of a linear plane;
   detect linear movement of said mobile device along at least one axis of said linear plane;
   determine a user input based on the detection of said angular movement and the detection of said linear movement, and
   manipulate an appearance of one or more images on a display of said mobile device based at least in part on the detection of said angular movement, the detection of said linear movement, and a predetermined point of interest, wherein said appearance of one for more images depict a geographical map, wherein said geographical map includes said predetermined point of interest.

31. The article of claim 30, wherein the machine-readable instructions are further configured to enable the computing platform to manipulate said appearance of said one or more images on said display by zooming said one or more images based, at least in part, on said detection of said linear movement.

32. The article of claim 30, wherein the machine-readable instructions are further configured to enable the computing platform to manipulate said appearance of one or more images to depict a sequence of images corresponding to a timing of said images.

33. The article of claim 30, wherein the machine-readable instructions are further configured to enable the computing platform to provide a control signal to a predetermined electronic device based on said user input.

34. The article of claim 30, wherein the machine-readable instructions are further configured to enable the computing platform to detect said linear movement based on a detected acceleration of said linear movement of said mobile device.

35. The article of claim 30, wherein the machine-readable instructions are further configured to enable the computing platform to detect said linear movement based on a detected distance by which said mobile device is moved.

* * * * *